US010771752B2

(12) United States Patent
Ota et al.

(10) Patent No.: US 10,771,752 B2
(45) Date of Patent: Sep. 8, 2020

(54) DISPLAY SYSTEM, CONTROL DEVICE, CONTROL METHOD FOR DISPLAY SYSTEM, AND COMPUTER PROGRAM

(71) Applicant: SEIKO EPSON CORPORATION, Tokyo (JP)

(72) Inventors: Akihiko Ota, Matsumoto (JP); Yusuke Kudo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/553,526

(22) Filed: Aug. 28, 2019

(65) Prior Publication Data
US 2020/0077061 A1 Mar. 5, 2020

(30) Foreign Application Priority Data
Aug. 29, 2018 (JP) .................................. 2018-160071

(51) Int. Cl.
G03B 21/14 (2006.01)
H04N 9/31 (2006.01)
H04N 5/74 (2006.01)

(52) U.S. Cl.
CPC ......... *H04N 9/3185* (2013.01); *G03B 21/147* (2013.01); *H04N 5/74* (2013.01); *H04N 9/3141* (2013.01)

(58) Field of Classification Search
CPC ........ G03B 21/147; G03B 21/14; H04N 9/31; H04N 9/3185
USPC ..................................................... 353/69, 70
See application file for complete search history.

(56) References Cited

U.S. PATENT DOCUMENTS

| 8,109,639 | B2 * | 2/2012 | Furui | H04N 9/3194 |
| | | | | 353/69 |
| 10,341,626 | B2 * | 7/2019 | Oike | H04N 9/3182 |
| 2004/0207819 | A1 | 10/2004 | Moriwaki et al. | |
| 2013/0083058 | A1 | 4/2013 | Yoshimura | |
| 2015/0036937 | A1 * | 2/2015 | Kim | G06T 3/0093 |
| | | | | 382/201 |

(Continued)

FOREIGN PATENT DOCUMENTS

| JP | 2004-320661 A | 11/2004 |
| JP | 2013-078001 A | 4/2013 |

*Primary Examiner* — William C. Dowling
(74) *Attorney, Agent, or Firm* — Oliff PLC

(57) ABSTRACT

A control device coupled to a projector that applies distortion correction to input image data to generate corrected image data and projects a corrected image includes a generating section configured to apply, based on correction data indicating content of the distortion correction, the distortion correction to reference image data indicating a reference image including a plurality of lattice points to generate preview image data indicating a preview image, a display section configured to display the preview image, an accepting section configured to accept enlarging operation, selecting operation for selecting a lattice point set as a correction target among a plurality of lattice points included in the preview image to be enlarged, and changing operation for changing a position to the lattice point to be selected, and a transmitting section configured to transmit a changing command for changing the distortion correction generated according to the changing operation to the projector.

8 Claims, 16 Drawing Sheets

(56) References Cited

U.S. PATENT DOCUMENTS

2015/0146990 A1* 5/2015 Uchiyama ............... G06T 5/006
 382/201
2019/0166339 A1* 5/2019 De La Cruz ......... H04N 9/3185

* cited by examiner

DISPLAY SYSTEM, CONTROL DEVICE, CONTROL METHOD FOR DISPLAY SYSTEM, AND COMPUTER PROGRAM

The present application is based on, and claims priority from JP Application Serial Number 2018-160071, filed Aug. 29, 2018, the disclosure of which is hereby incorporated by reference herein in its entirety.

BACKGROUND

1. Technical Field

The present disclosure relates to a display system, a control device, a control method for the display system, and a computer program.

2. Related Art

There has been proposed to correct, on a display section of a control device, a shape of an image projected by a projector. For example, JP-A-2004-320661 (Patent Literature 1) discloses a display system in which a display section of a control device displays a preview image of an image projected by a projector. The preview image includes a rectangle. In the image projected by the projector, the rectangle is distorted along a projection surface. A user deforms the rectangle of the preview image and corrects the rectangle such that the distortion of the rectangle in the image projected by the projector is offset. JP-A-2013-78001 (Patent Literature 2) discloses a projector that changes the positions of a plurality of lattice points disposed in an image projected on a projection surface to thereby correct a shape of an image projected by the projector.

However, in the related art, when the preview image displayed on the display section includes a plurality of lattice points, if the lattice points increase, a lattice point that the user desires to select partially overlaps or is close to another lattice point. This makes it difficult to select the lattice point that the user desires to select.

SUMMARY

A display system according to an aspect of the present disclosure is a display system including a projector and a control device coupled to the projector. The projector includes: a correcting section configured to apply distortion correction to input image data to generate corrected image data; and a projecting section configured to project a corrected image based on the corrected image data. The control device includes: a generating section configured to apply, based on correction data indicating content of the distortion correction acquired from the projector, processing including the distortion correction to reference image data indicating a reference image including a plurality of lattice points to generate preview image data indicating a preview image; a display section configured to display the preview image based on the preview image data; an accepting section configured to accept enlarging operation for the preview image, selecting operation for selecting a lattice point set as a correction target among a plurality of lattice points included in the preview image to be enlarged, and changing operation for changing a position to the lattice point to be selected; and a transmitting section configured to generate, according to the changing operation, a changing command for changing the distortion correction in the correcting section and transmit the changing command to the projector.

A control device according to another aspect of the present disclosure is a control device coupled to a projector that applies distortion correction to input image data to generate corrected image data and projects a corrected image based on the corrected image data. The control device includes: a generating section configured to apply, based on correction data indicating content of the distortion correction acquired from the projector, processing including the distortion correction to reference image data indicating a reference image including a plurality of lattice points to generate preview image data indicating a preview image; a display section configured to display the preview image based on the preview image data; an accepting section configured to accept enlarging operation for the preview image, selecting operation for selecting a lattice point set as a correction target among a plurality of lattice points included in the preview image to be enlarged, and changing operation for changing a position to the lattice point to be selected; and a transmitting section configured to generate, according to the changing operation, a changing command for changing the distortion correction and transmit the changing command to the projector.

A control method for a display system according to still another aspect of the present disclosure is a control method for a display system including a projector and a control device coupled to the projector. The control method including: the projector applying distortion correction to input image data to generate corrected image data and projecting a corrected image based on the corrected image data; and the control device applying, based on correction data indicating content of the distortion correction acquired from the projector, processing including the distortion correction to reference image data indicating a reference image including a plurality of lattice points to generate preview image data indicating a preview image, displaying the preview image based on the preview image data, accepting enlarging operation for the preview image, selecting operation for selecting a lattice point set as a correction target among a plurality of lattice points included in the preview image to be enlarged, and changing operation for changing a position to the lattice point to be selected, and generating, according to the changing operation, a changing command for changing the distortion correction and transmitting the changing command to the projector.

A non-transitory computer-readable storage medium storing a program according to still another aspect of the present disclosure is a non-transitory computer-readable storage medium storing a program of a control device coupled to a projector that applies distortion correction to input image data to generate corrected image data and projects a corrected image based on the corrected image data, the control device including a display section, the program causing the control device to function as: a generating section configured to apply, based on correction data indicating content of the distortion correction acquired from the projector, processing including the distortion correction to reference image data indicating a reference image including a plurality of lattice points to generate preview image data indicating a preview image; a display control section configured to cause the display section to display the preview image based on the preview image data; an accepting section configured to accept enlarging operation for the preview image, selecting operation for selecting a lattice point set as a correction target among a plurality of lattice points included in the preview image to be enlarged, and changing operation for changing a position to the lattice point to be selected; and a transmitting section configured to generate, according to the changing operation, a changing command for changing the distortion correction and transmit the changing command to the projector.

DESCRIPTION OF EXEMPLARY EMBODIMENTS

Modes for carrying out the present disclosure are explained below with reference to the drawings. In the figures, dimensions and scales of sections are differentiated from actual ones as appropriate. Since embodiments explained below are preferred specific examples of the present disclosure, technically preferable various limitations are added to the embodiments. However, the scope of the present disclosure is not limited to these modes unless, in the following explanation, there is a particular description to the effect the present disclosure is limited.

A. First Embodiment

A display system 1 according to a first embodiment is explained below.
A. 1. Overview of the Display System 1

Figure 1:
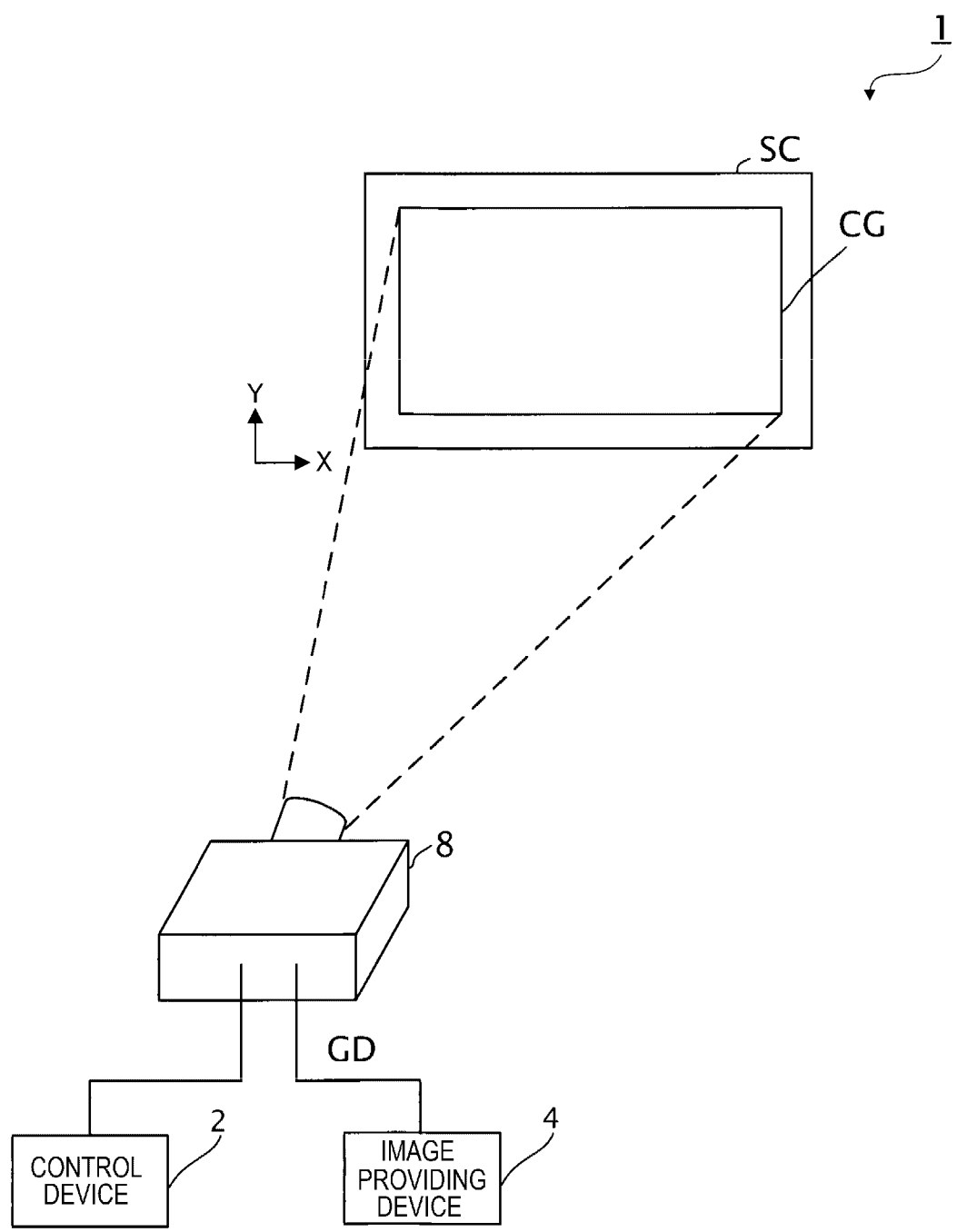
FIG. 1 is a diagram showing a display system.

The display system 1 is shown in FIG. 1. The display system 1 includes a control device 2 coupled to a projector 8, an image providing device 4, and the projector 8. In this embodiment, the projector 8 capable of correcting, according to operation by a user, a shape of an image to be projected is explained.

The control device 2 controls the projector 8. The image providing device 4 provides input image data GD to the projector 8. The projector 8 applies distortion correction to the input image data GD to generate corrected image data CGD shown in FIG. 2, and projects a corrected image CG based on the corrected image data CGD onto a projection surface SC.

The distortion correction is processing for correcting distortion of an image. As a situation in which the distortion of the image occurs, there are two situations explained below. A first situation is a situation in which the projection surface SC is a curved surface or unevenness is present on the projection surface SC. A second situation is a situation in which the projector 8 projects the image from a position other than the front of the projection surface SC. The control device 2 changes the distortion correction according to operation by the user such that distortion of the image projected onto the projection surface SC is offset. The projector 8 applies the distortion correction to the input image data GD to generate corrected image data CGD. Since the distortion correction is processing for geometrically correcting a shape of an image, the distortion correction is called "geometrical distortion correction" as well.

Figure 2:
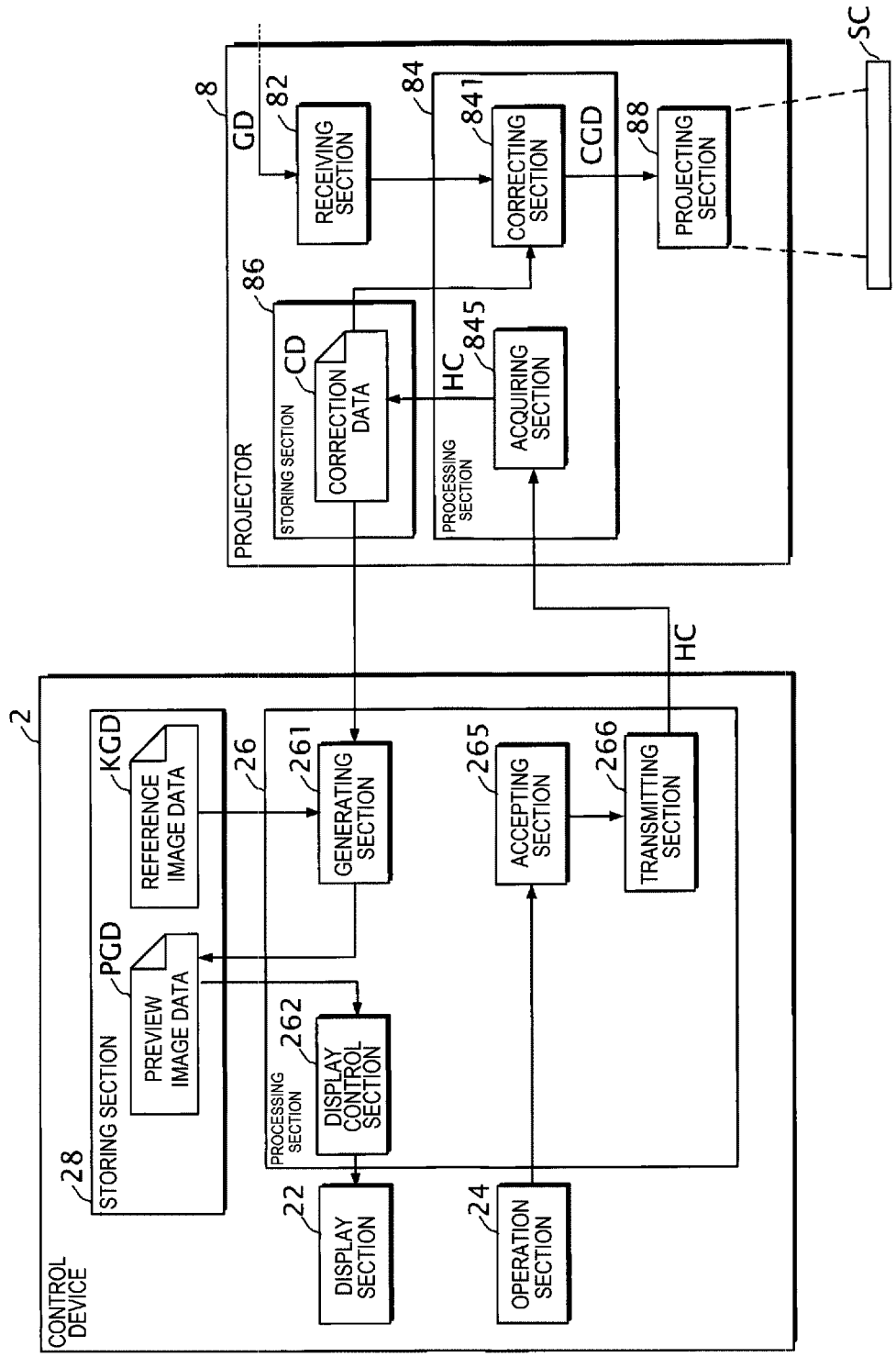
FIG. 2 is a diagram showing a configuration example of the display system.

In the following explanation, an X axis and a Y axis on the projection surface SC are defined. The X axis and the Y axis are orthogonal to each other.
A. 2. Configuration of the First Embodiment A configuration example of the display system 1 is shown in FIG. 2. In the following explanation, a series of operation of the projector 8 from reception of the input image data GD to projection of the corrected image CG onto the projection surface SC is explained and a series of operation of the control device 2 from acquisition of correction data CD indicating the distortion correction from the projector 8 to changing of the distortion correction is explained.
A. 2. 1. Explanation of the Operation of the Projector 8

The projector 8 includes a receiving section 82, a processing section 84, a storing section 86, and a projecting section 88. The receiving section 82 receives the input image data GD from the image providing device 4.

The processing section 84 is a computer such as a CPU (Central Processing Unit). The processing section 84 may be configured by one or a plurality of processors. The processing section 84 reads and executes a computer program stored in the storing section 86 to thereby function as a correcting section 841 and an acquiring section 845.

The correcting section 841 applies the distortion correction to the input image data GD to generate the corrected image data CGD. Content of the distortion correction is indicated by the correction data CD stored in the storing section 86. In order to show a specific example of content of the correction data CD, a specific method of the distortion correction is explained.

Figure 3:
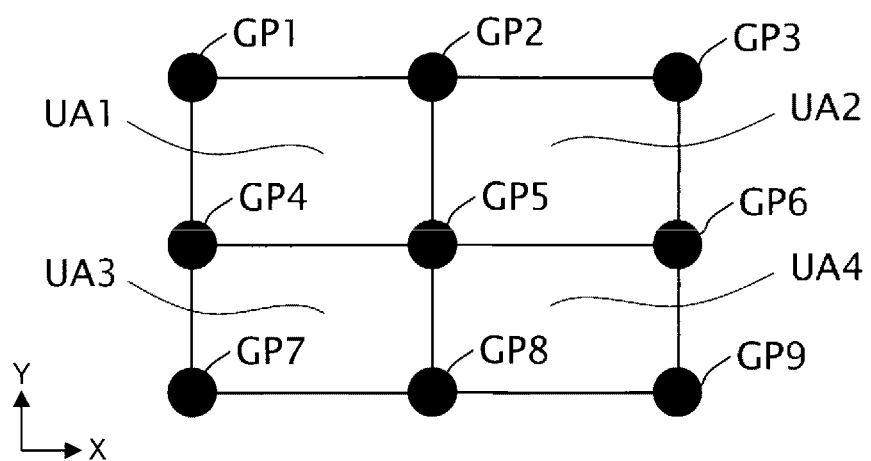
FIG. 3 is a diagram showing an example of a plurality of unit areas before distortion correction.

The correcting section 841 divides an image indicated by the input image data GD into a plurality of unit areas UA shown in FIG. 3 and applies correction processing to each of the unit areas UA.

An example of the plurality of unit areas UA before the distortion correction is shown in FIG. 3. A lattice point GP1, a lattice point GP2, a lattice point GP3, a lattice point GP4, a lattice point GP5, a lattice point GP6, a lattice point GP7, a lattice point GP8, and a lattice point GP9 shown in FIG. 3 are respectively located at vertexes in each of a unit area UA1, a unit area UA2, a unit area UA3, and a unit area UA4.

As shown in FIG. 3, the shape of each of the unit areas UA before the distortion correction is a rectangle.

In the following explanation, when elements of the same type are distinguished, reference signs are used as in the lattice point GP1 and the lattice point GP2. On the other hand, when the elements of the same type are not distinguished, only a common sign of the reference signs is used as in the lattice point GP.

The number of the lattice points GP only has to be a number for enabling formation of two or more unit areas UA. In the example shown in FIG. 3, to facilitate explanation, nine lattice points GP and two unit areas UA are shown.

Figure 4:
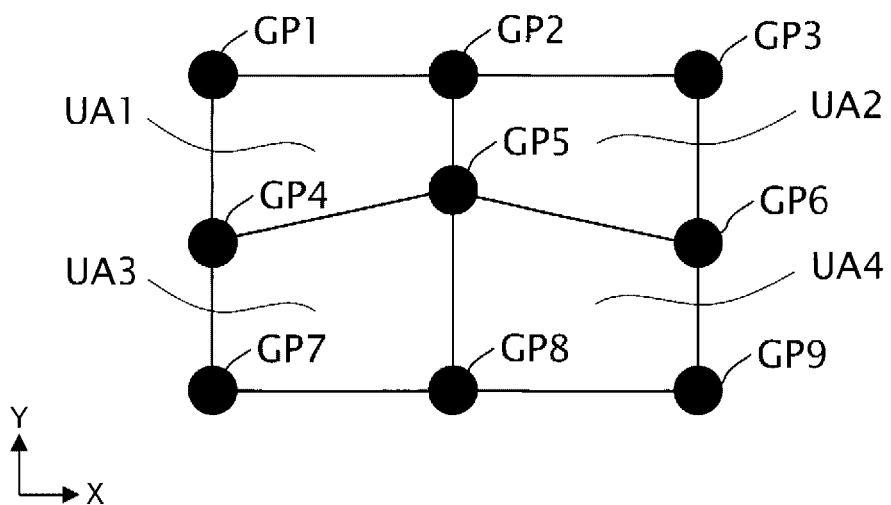
FIG. 4 is a diagram showing an example of the plurality of unit areas after the distortion correction.

An example of a plurality of unit areas UA after the distortion correction is shown in FIG. 4. In FIG. 4, a state after deformation of the shape of the plurality of unit areas UA is shown. Specifically, in FIG. 4, the lattice point GP5 is moved in a Y-axis positive direction and the unit area UA1, the unit area UA2, the unit area UA3, and the unit area UA4 are deformed. The correcting section 841 corrects images in the unit areas UA before the deformation to fit in the unit areas UA after the deformation. Content of the correction data CD is positions of the respective lattice points GP after the deformation. The corrected image CG corrected according to the positions of the lattice points GP after the deformation shown in FIG. 4 is distorted if the projection surface SC is a plane. However, when the projection surface SC is a curved surface or unevenness is present on the projection surface SC, an image without distortion can be obtained.

An initial value of the correction data CD has two forms explained below. A first form of the initial value of the correction data CD is positions of the lattice points GP without correction. A second form of the initial value of the correction data CD is positions of the lattice points GP predetermined according to a shape of the projection surface SC such as a curved surface or a slope.

Referring back to FIG. 2, the projecting section 88 projects the corrected image CG based on the corrected image data CGD.

Figure 5:
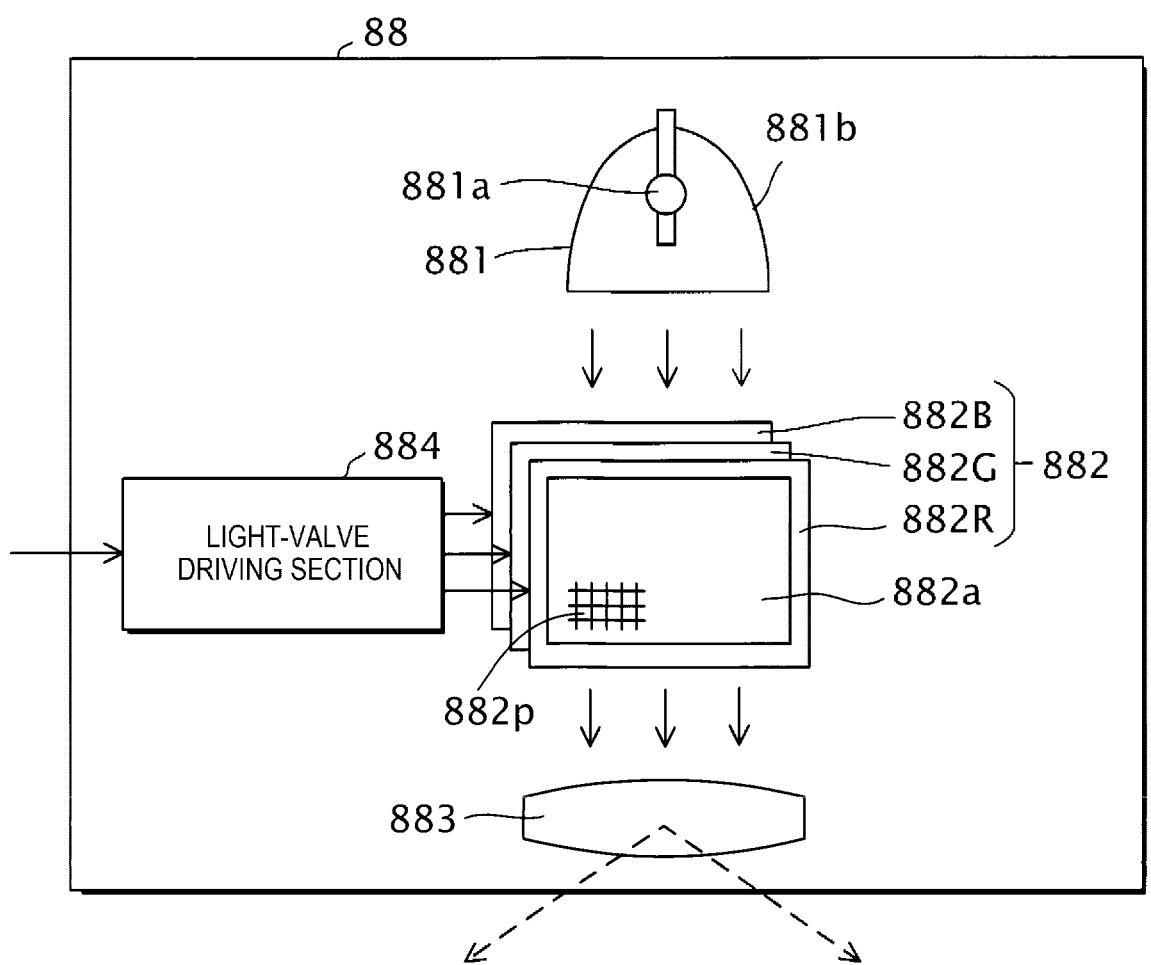
FIG. 5 is a diagram showing an example of a projecting section.

An example of the projecting section 88 is shown in FIG. 5. The projecting section 88 includes a light source 881, three liquid crystal light valves 882R, 882G, and 882B, which are examples of an optical modulation device, a projection lens 883, which is an example of a projection optical system, and a light-valve driving section 884. The projecting section 88 modulates light emitted from the light source 881 with the liquid crystal light valves 882 to form the corrected image CG and enlarges the corrected image CG and projects the corrected image CG from the projection lens 883. The image is displayed on the projection surface SC.

The light source 881 includes a light source section 881a formed from a Xenon lamp, an ultra-high pressure mercury lamp, an LED, a laser beam source, or the like and a reflector 881b that reduces fluctuation in a direction of light radiated by the light source section 881a. Light emitted from the light source 881 is reduced in fluctuation of a luminance distribution by a not-shown integrator optical system and thereafter separated into color light components of red, green, and blue, which are the three primary colors of light, by a not-shown color separation optical system. The color light components of red, green, and blue are respectively made incident on the liquid crystal light valves 882R, 882G, and 882B.

The liquid crystal light valve 882 is configured by a liquid crystal panel or the like in which liquid crystal is encapsulated between a pair of transparent substrates. In the liquid crystal light valve 882, a rectangular pixel region 882a formed from a plurality of pixels 882p arrayed in a matrix shape is formed. The liquid crystal light valve 882 is capable of applying a driving voltage to the liquid crystal for each of the pixels 882p. When the light-valve driving section 884 applies a driving voltage corresponding to the corrected image data CGD to the pixels 882p, the pixels 882p are set to a light transmission ratio corresponding to the corrected image data CGD. Therefore, light emitted from the light source 881 is transmitted through the pixel region 882a to be modulated. The corrected image CG to be projected on the projection surface SC is formed for each color light.

Referring back to FIG. 2, the storing section 86 is a recording medium readable by the processing section 84. The storing section 86 is configured by one or more kinds of storage circuits such as a ROM (Read Only Memory), an EPROM (Erasable Programmable ROM), an EEPROM (Electrically Erasable Programmable ROM), and a RAM (Random Access Memory). The storing section 86 stores the correction data CD.

A. 2. 2. Explanation of the Operation of the Control Device 2

The control device 2 includes a display section 22, an operation section 24, a processing section 26, and a storing section 28.

The display section 22 is electrically coupled to the processing section 26 and formed by a display panel such as a liquid crystal panel, an electronic paper panel, or an organic electroluminescence panel.

The operation section 24 accepts operation by the user. The operation section 24 is, for example, a keyboard and a mouse.

The processing section 26 is a computer such as a CPU. The processing section 26 may be configured by one or a plurality of processors. The processing section 26 reads and executes a computer program stored in the storing section 28 to thereby function as a generating section 261, a display control section 262, an accepting section 265, and a transmitting section 266.

Figure 6:
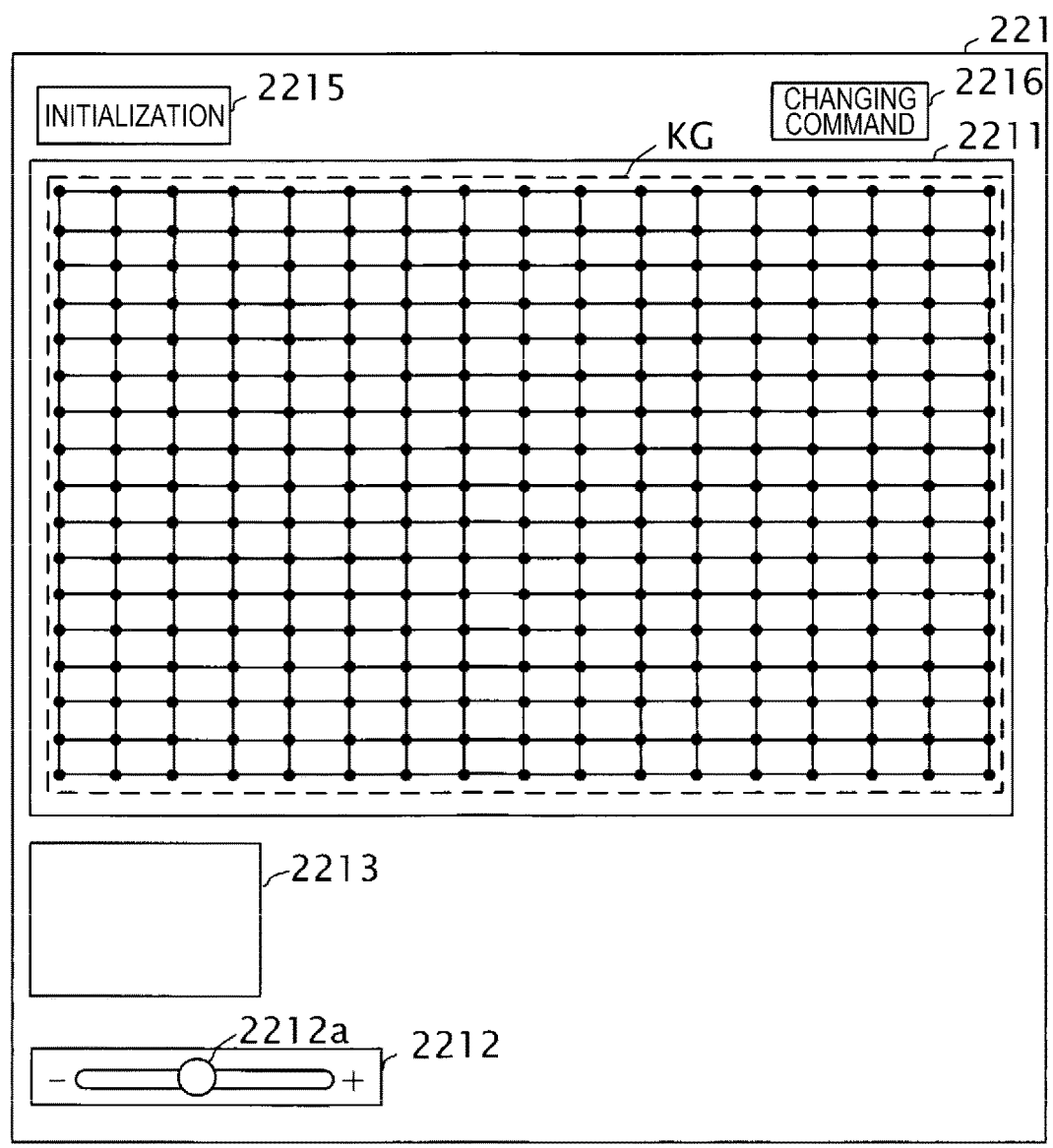
FIG. 6 is a diagram showing an example of a distortion correction display screen showing a reference image.

The generating section 261 acquires the correction data CD from the projector 8 and applies processing including distortion correction corresponding to the correction data CD to reference image data KGD indicating a reference image KG shown in FIG. 6 to generate preview image data PGD indicating a preview image PG. The reference image KG includes a plurality of lattice points GP. The display control section 262 causes the display section 22 to display the preview image PG. The display section 22 displays the preview image PG based on the preview image data PGD. The accepting section 265 accepts enlarging operation for the preview image PG, selecting operation for selecting the lattice point GP set as a correction target among the plurality of lattice points GP included in the preview image PG to be enlarged, and changing operation for changing a position to the lattice point GP to be selected. The transmitting section 266 transmits a changing command HC for changing the distortion correction in the correcting section 841 generated according to the changing operation to the projector 8. The lattice point GP to be selected is hereinafter referred to as "selected lattice point SGP".

An example of a distortion correction display screen 221 showing the reference image KG is shown in FIG. 6. The distortion correction display screen 221 includes an image display region 2211 for displaying the reference image KG or the preview image PG, a slider bar 2212, a pan zoom display region 2213, an initialization button 2215, and a changing command button 2216. The image display region 2211 shown in FIG. 6 displays the reference image KG.

In the following explanation, the horizontal direction in the display section 22 is defined as an x-axis direction and the vertical direction in the display section 22 is defined as a y-axis direction to distinguish the x-axis direction and the y-axis direction from an X axis and a Y axis on the projection surface SC.

In FIG. 6, signs are not shown to avoid complication. However, black circles are the lattice points GP. In FIG. 6 and subsequent figures, seventeen lattice points GP are disposed along the x-axis direction and seventeen lattice points GP are disposed along the y-axis direction. Therefore, sixteen unit areas UA are disposed along the x-axis direction and sixteen unit areas UA are disposed along the y-axis direction.

The slider bar 2212 includes a slider 2212a. When the operation section 24 accepts, as the enlarging operation for the preview image PG, operation for moving the slider 2212a in the positive direction of the x axis, the display section 22 enlarges the preview image PG and displays the preview image PG to be enlarged. On the other hand, when the operation section 24 accepts operation for moving the slider 2212a in the negative direction of the x axis, the display section 22 displays the preview image PG not to be enlarged instead of the preview image PG to be enlarged. The pan zoom display region 2213 is used when the preview image PG to be enlarged is displayed in the image display region 2211. According to pressing of the initialization button 2215, the display section 22 cancels the distortion correction already carried out and displays the reference image KG in the image display region 2211. According to pressing of the changing command button 2216, the transmitting section 266 transmits the changing command HC to the projector 8.

Referring back to FIG. 2, the preview image PG has, for example, four forms explained below. A first form of the preview image PG is an image obtained by applying only the distortion correction to the reference image KG. A second form of the preview image PG is an image obtained by applying the distortion correction and processing for highlighting the selected lattice point SGP to the reference image KG. A third form of the preview image PG is an image obtained by applying the distortion correction and processing for disposing an identifier for identifying one unit area UA in each of the plurality of unit areas UA to the reference image KG. A fourth form of the preview image PG is a combination of the second form of the preview image PG and the third form of the preview image PG.

Figure 7:
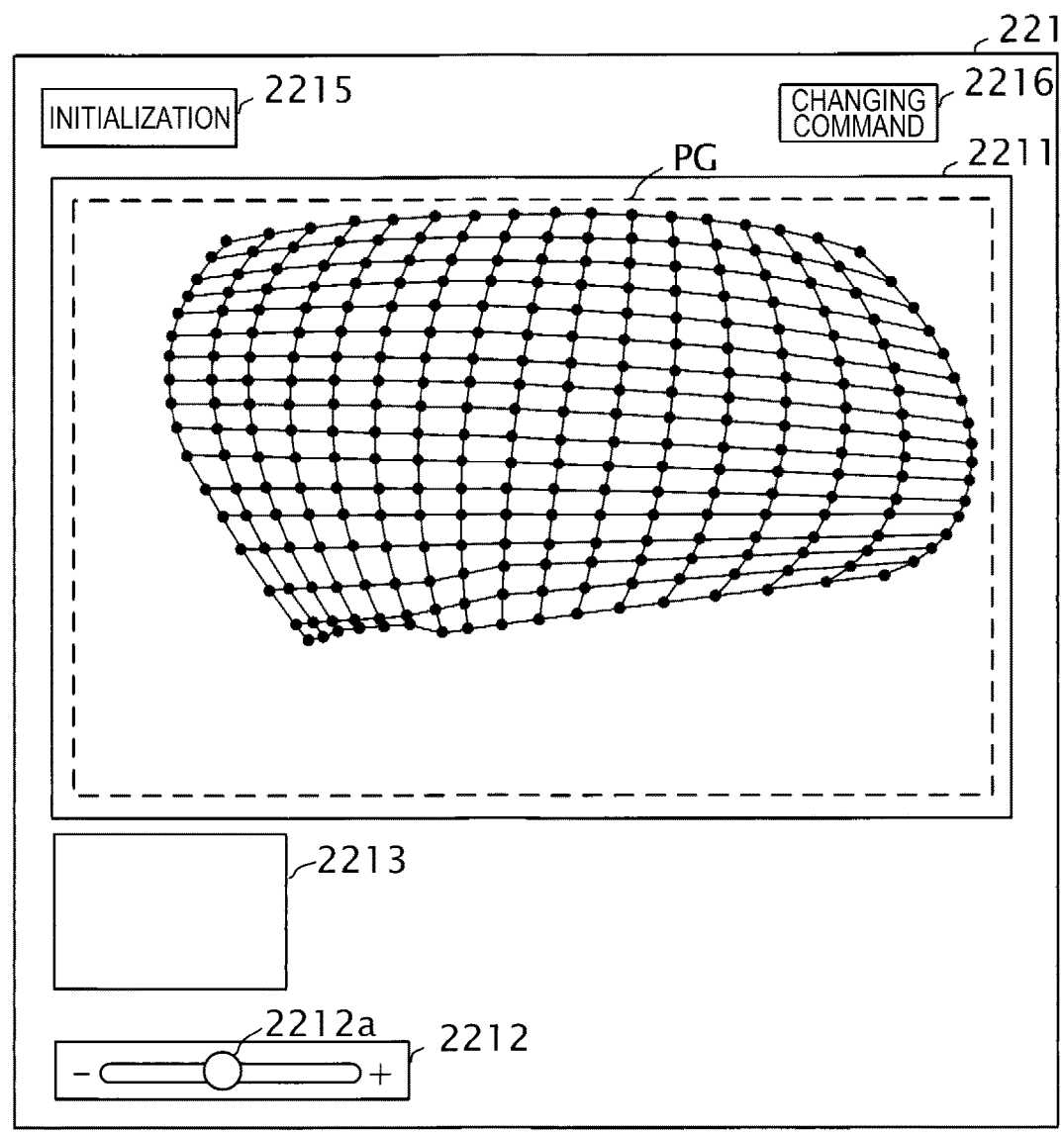
FIG. 7 is a diagram showing an example of the distortion correction display screen showing a first form of a preview image.

An example of the distortion correction display screen 221 showing the first form of the preview image PG is shown in FIG. 7. The first form of the preview image PG is an image obtained by applying only the distortion correction to the reference image KG. The image display region 2211 shown in FIG. 7 shows the first form of the preview image PG.

The preview image PG may or may not include line segments indicating sides of the unit areas UA. The preview image PG explained below includes the line segments indicating the sides of the unit areas UA.

Figure 8:
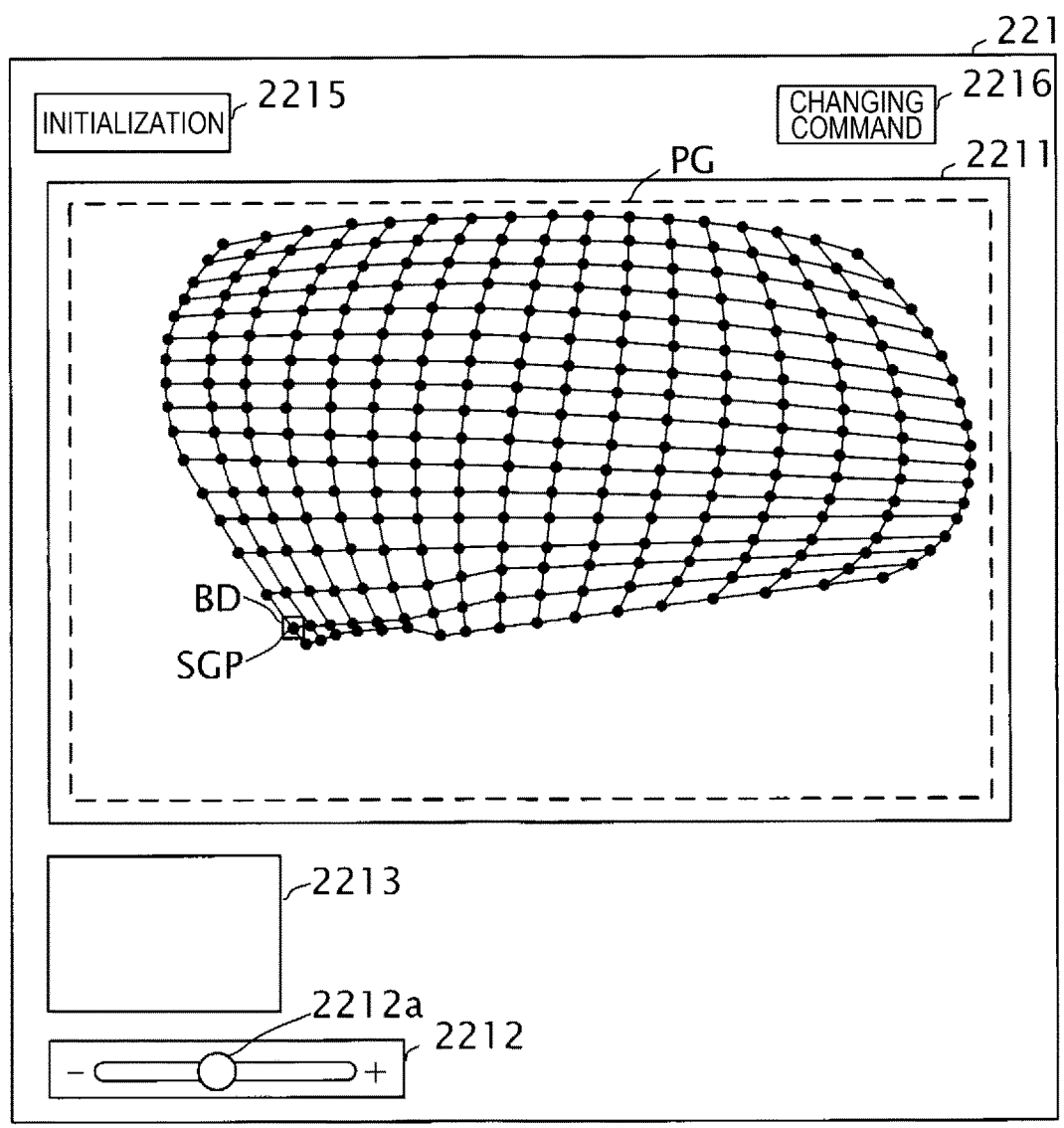
FIG. 8 is a diagram showing an example of the distortion correction display screen showing a second form of the preview image.

An example of the distortion correction display screen 221 showing the second form of the preview image PG is shown in FIG. 8. The generating section 261 applies the distortion correction and the processing for highlighting the selected lattice point SGP to the reference image KG to generate the preview image data PGD indicating the second form of the preview image PG. The image display region 2211 shown in FIG. 8 displays the second form of the preview image PG. The processing for highlighting the selected lattice point SGP has, for example, two forms explained below. A first form of the processing for highlighting the selected lattice point SGP displays a frame surrounding the selected lattice point SGP. A second form of the processing for highlighting the selected lattice point SGP changes a color of the selected lattice point SGP to a color different from a color of the other lattice points GP. In the example shown in FIG. 8, as the first form of the processing for highlighting the selected lattice point SGP, the display section 22 displays a frame BD surrounding the selected lattice point SGP.

Concerning the third form of the preview image PG, the generating section 261 applies the distortion correction and processing for disposing a character for identifying one unit area UA in each of the plurality of unit areas UA to the reference image KG to generate the preview image data PGD indicating the third form of the preview image PG. The identifier for identifying the unit area UA is hereinafter referred to as "unit area identifier". The identifier includes a character, a number, and a sign.

Figure 9:
FIG. 9 is a diagram showing an example of a unit area identifier.

An example of the unit area identifier is shown in FIG. 9. As shown in Table T1, the unit area identifier is a character string obtained by combining one alphabet and one or two numbers. Specifically, a first character of the unit area identifier is "A" if a row to which the character belongs is a first row, "B" if the row is a second row, "C" if the row is a third row, . . . , and "P" if the row is a sixteenth row counted from the end in the positive direction of the y axis. Similarly, second and subsequent characters of the unit area identifier are "1" if a column to which the characters belong is a first column, "2" if the column is a second column, "3" if the column is a third column, . . . , and "16" if the column is a sixteenth column counted from the end in the negative direction of the x axis.

Figure 10:
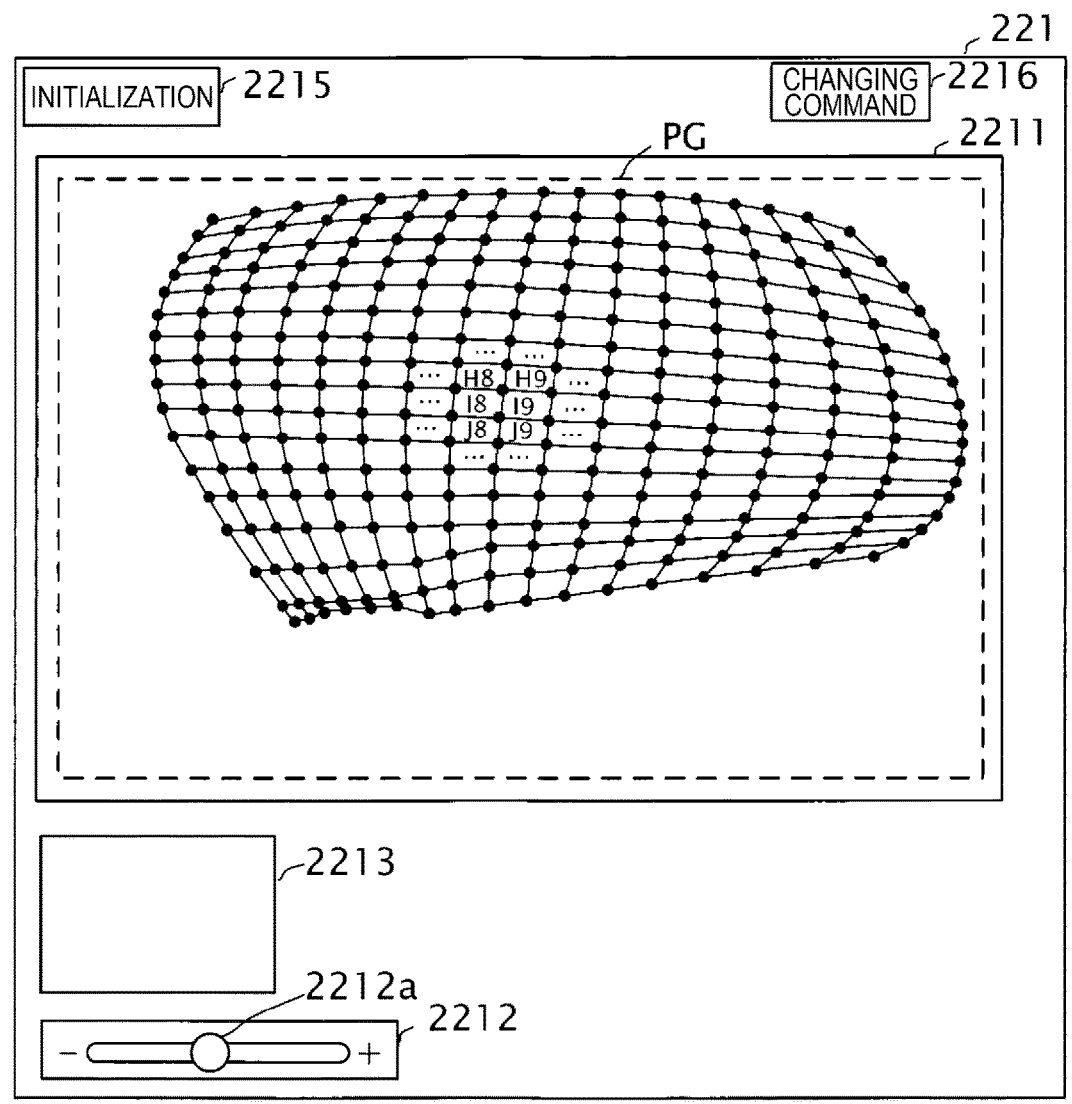
FIG. 10 is a diagram showing an example of the distortion correction display screen showing a third form of the preview image.

An example of the distortion correction display screen 221 showing the third form of the preview image PG is shown in FIG. 10. The image display region 2211 shown in FIG. 10 displays the third form of the preview image PG. In FIG. 10, to prevent complication of the drawing, only a part of the plurality of unit area identifiers is representatively shown.

The fourth form of the preview image PG is a combination of the second form of the preview image PG and the third form of the preview image PG. That is, the generating section 261 applies the distortion correction, the processing for highlighting the selected lattice point SGP, and the processing for disposing the unit area identifier to the reference image KG to generate the preview image data PGD indicating the fourth form of the preview image PG.

Referring back to FIG. 2, the acquiring section 845 acquires the changing command HC from the transmitting section 266 and updates the correction data CD based on the changing instruction HC. According to the update of the correction data CD, the correcting section 841 applies the distortion correction after the update to the input image data GD to generate the corrected image data CGD. The projecting section 88 projects the corrected image CG on which distortion correction after the update is reflected.

A. 3. Operation of the Display System 1 in the First Embodiment

A flowchart showing content of the operation of the display system 1 is explained with reference to FIG. 11.

Figure 11:
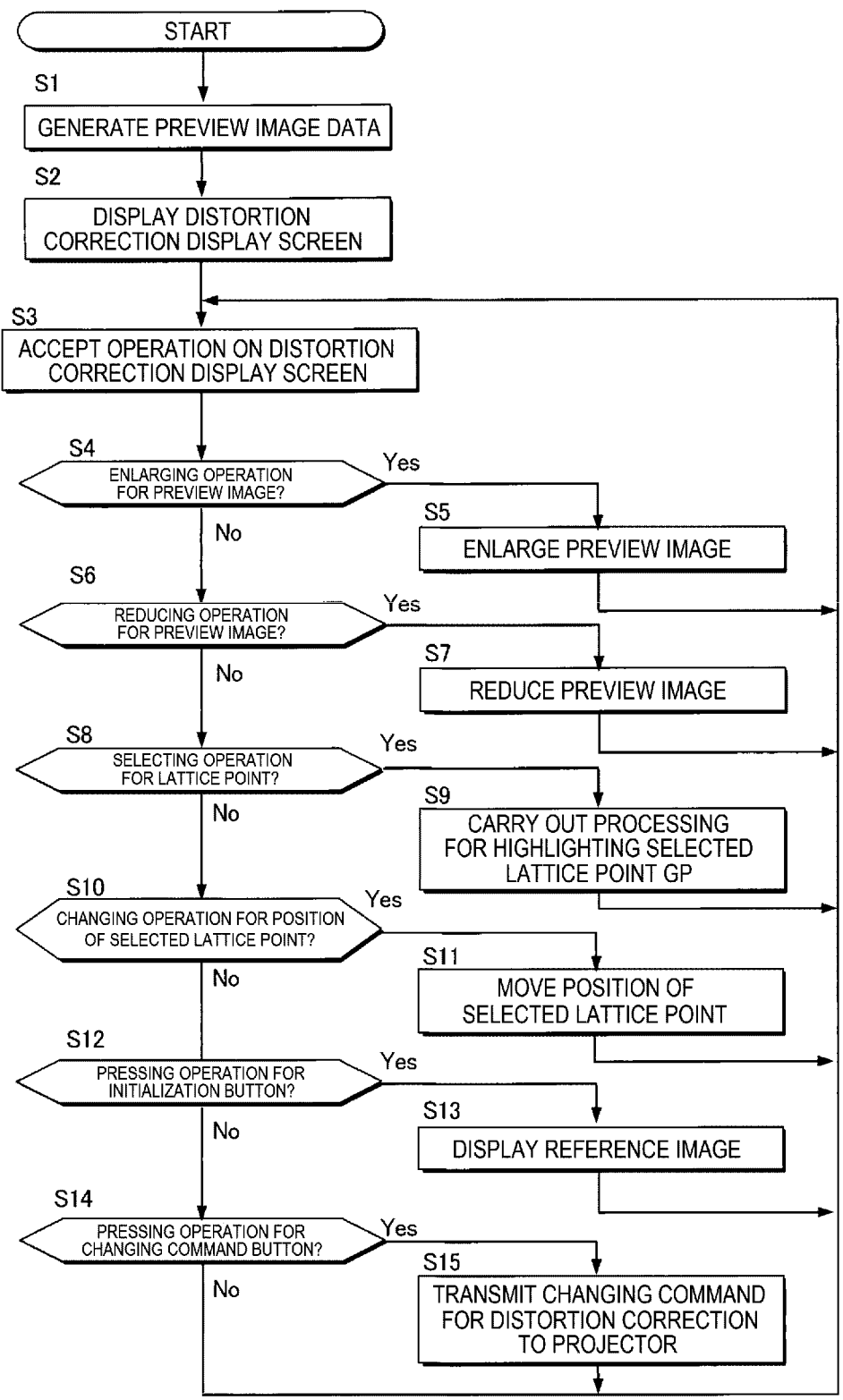
FIG. 11 is a flowchart showing content of the operation of the display system.

The flowchart showing the content of the operation of the display system 1 is shown in FIG. 11. In step S1, the generating section 261 applies, based on the correction data CD, the distortion correction to the reference image data KGD and generates the preview image data PGD indicating the preview image PG. Subsequently, in step S2, the display section 22 displays the distortion correction display screen 221 including the preview image PG indicated by the preview image data PGD. In step S3, the accepting section 265 accepts operation on the distortion correction display screen 221.

In step S4, the accepting section 265 determines whether the accepted operation is enlarging operation for the preview image PG. The enlarging operation for the preview image PG is, for example, operation for moving the slider 2212a in the positive direction of the x axis. In the case of Yes in step S4, that is, when the accepted operation is the enlarging operation for the preview image PG, in step S5, the display section 22 enlarges the preview image PG and displays the preview image PG to be enlarged. After the processing in step S5, the processing section 26 returns the processing to step S3.

Figure 12:
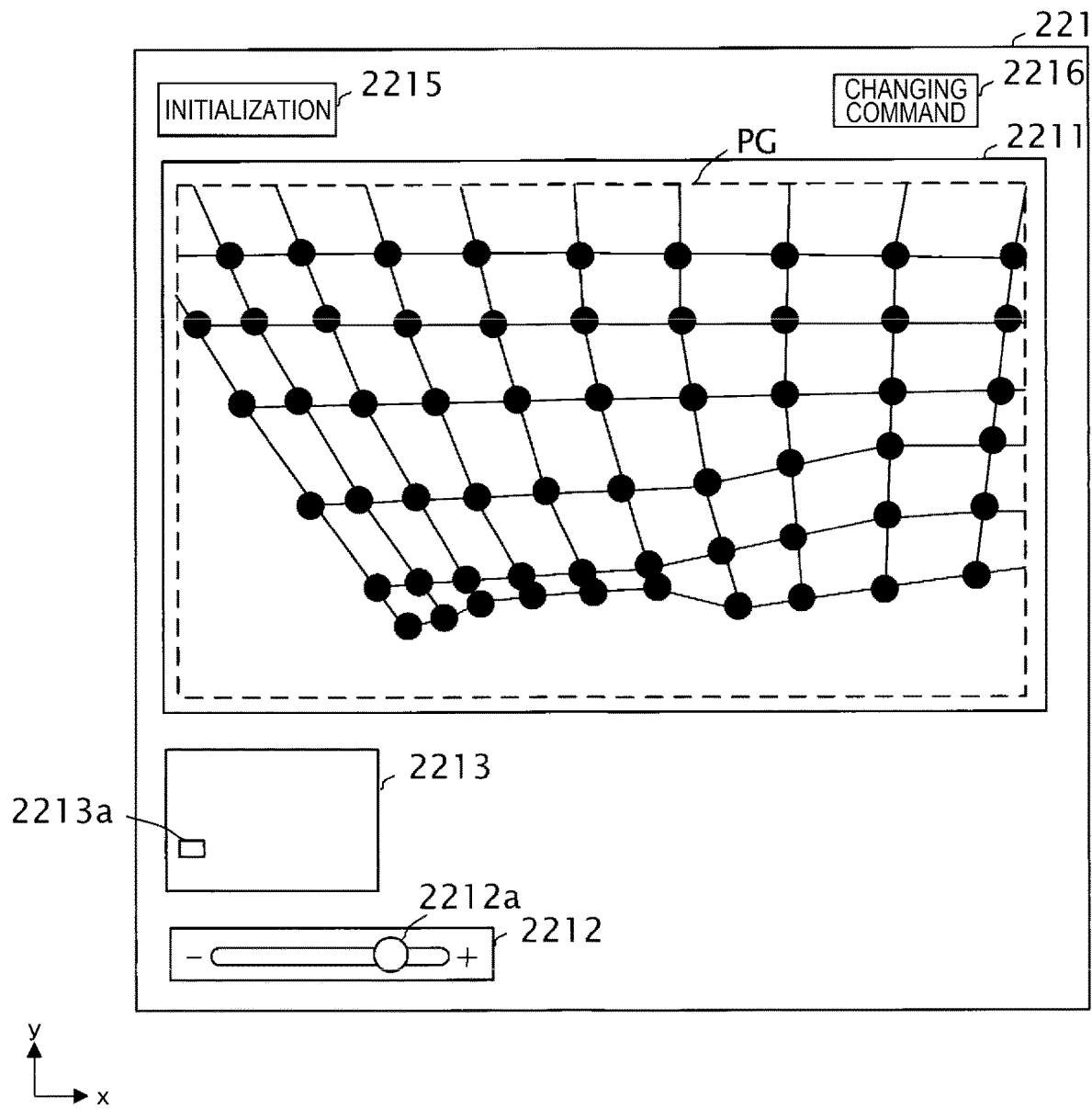
FIG. 12 is a diagram showing an example of the distortion correction display screen showing the preview image to be enlarged.

An example of the distortion correction display screen 221 showing the preview image PG to be enlarged is shown in FIG. 12. In the image display region 2211 shown in FIG. 12, the display section 22 enlarges the preview image PG. The pan zoom display region 2213 includes a frame 2213a indicating a region where the preview image PG to be enlarged is displayed in the preview image PG when the image display region 2211 displays the preview image PG to be enlarged.

In FIG. 12, the image display region 2211 displays an image obtained by enlarging the first form of the preview image PG. When the second form of the preview image PG is enlarged, an image displayed in the image display region 2211 includes the selected lattice point SGP to which the highlighting processing is applied. Similarly, when the third form of the preview image PG is enlarged, the unit area identifier is included in the image displayed in the image display region 2211.

Referring back to FIG. 11, in the case of No in step S4, that is, when the accepted operation is not the enlarging operation for the preview image PG, in step S6, the accepting section 265 determines whether the accepted operation is reducing operation for the preview image PG. The reducing operation for the preview image PG is, for example, operation for moving the slider 2212a in the negative direction of the x axis. In the case of Yes in step S6, that is, when the accepted operation is the reducing operation for the preview image PG, in step S7, the display section 22 reduces the preview image PG to be enlarged. That is, the display section 22 displays the preview image PG not to be enlarged. After the processing in step S7, the processing section 26 returns the processing to step S3.

In the case of No in step S6, that is, when the accepted operation is not the reducing operation for the preview image PG, in step S8, the accepting section 265 determines whether the accepted operation is selecting operation for the lattice point GP. The selecting operation for the lattice point GP is, for example, pressing operation for the mouse on the lattice point GP. In the case of Yes in step S8, that is, when the accepted operation is the selecting operation for the lattice point GP, in step S9, the generating section 261 carries out the processing for highlighting the selected lattice point SGP to generate the preview image data PGD. The display section 22 displays the preview image PG indicated by the preview image data PGD to be generated. After the processing in step S9, the processing section 26 returns the processing to step S3.

On the other hand, in the case of No in step S8, that is, when the accepted operation is not the selecting operation for the lattice point GP, in step S10, the accepting section 265 determines whether the accepted operation is changing operation for the position of the selected lattice point SGP. In the case of Yes in step S10, that is, when the accepted operation is the changing operation for the position of the selected lattice point SGP, in step S11, the display section 22 moves the position of the selected lattice point SGP and displays the preview image PG including the selected lattice point SGP after the movement. After the processing in step S11, the processing section 26 returns the processing to step S3.

On the other hand, in the case of No in step S10, that is, when the accepted operation is not the changing operation for the position of the lattice point GP, in step S12, the accepting section 265 determines whether the accepted operation is pressing operation for the initialization button 2215. In the case of Yes in step S12, that is, when the accepted operation is the pressing operation for the initialization button 2215, in step S13, the display section 22 cancels the carried-out distortion correction and displays the reference image KG in the image display region 2211. After the processing in step S13, the processing section 26 return the processing to step S3.

On the other hand, in the case of No in step S12, that is, when the accepted operation is not the pressing operation for the initialization button 2215, in step S14, the accepting section 265 determines whether the accepted operation is pressing operation for the changing command button 2216. In the case of Yes in step S14, that is, when the accepted operation is the pressing operation for the changing command button 2216, in step S15, the transmitting section 266 transmits the changing command HC for the distortion correction generated according to the changing operation to the projector 8. After the processing in step S15 or in the case of No in step S14, that is, when the accepted operation is not the pressing operation for the changing command button 2216, the processing section 26 returns the processing to step S3.

A. 4. Effects of the First Embodiment

As explained above, in one form of the display system 1, the display system 1 includes the projector 8 and the control device 2 coupled to the projector 8. The projector 8 includes the correcting section 841 that applies the distortion correction to the input image data GD to generate the corrected image data CGD and the projecting section 88 that projects the corrected image CG based on the corrected image data CGD. The control device 2 includes the generating section 261, the display section 22, the accepting section 265, and the transmitting section 266. The generating section 261 applies, based on the correction data CD indicating the content of the distortion correction acquired from the projector 8, the processing including the distortion correction to the reference image data KGD indicating the reference image KG including the plurality of lattice points GP to generate the preview image data PGD indicating the preview image PG. The display section 22 displays the preview image PG based on the preview image data PGD. The accepting section 265 accepts the enlarging operation for the preview image PG, the selecting operation for selecting the lattice point GP set as the correction target among the plurality of lattice points GP included in the preview image PG to be enlarged, and the changing operation for changing a position to the lattice point GP to be selected. The transmitting section 266 transmits the changing command HC for changing the distortion correction in the correcting section 841 generated according to the changing operation to the projector 8.

With the form explained above, even when the lattice point GP that the user desires to select partially overlaps or is close to another lattice point GP and it is difficult for the user to select the lattice point GP that the user desires to select, since the interval between the lattice points GP expands in the preview image PG to be enlarged, it is easy for the user to select the lattice point GP that the user desires to select. Since it is easy for the user to select the lattice point GP that the user desires to select, it is easy to adjust the distortion correction.

In one form of the display system 1, the generating section 261 applies the processing including the distortion correction and the processing for highlighting the selected lattice point SGP to the reference image data KGD to generate the preview image data PGD indicating the second form of the preview image PG.

With the form explained above, by viewing the preview image PG, the user is capable of easily grasping which of the plurality of lattice points GP the selected lattice point SGP is.

In one form of the display system 1, the plurality of lattice points GP are located at the vertexes in each of the plurality of unit areas UA. The generating section 261 applies the processing including the distortion correction and the processing for disposing the identifier for identifying one unit area UA in each of the plurality of unit areas UA to the reference image data KGD to generate the preview image data PGD indicating the third form of the preview image PG.

With the form explained above, by viewing the unit area identifier in the preview image PG, the user is capable of easily identifying the respective unit areas UA. For example, when the unit area identifier is not disposed in the preview image PG to be enlarged, it is sometimes difficult for the user to specify which of all the unit areas UA the unit area UA displayed in the distortion correction display screen 221 is.

On the other hand, with the form explained above, since the unit area identifier is disposed in the unit area UA, the user is capable of easily identifying the respective unit areas UA.

"The processing including the distortion correction and the processing for disposing the identifier for identifying one unit area UA in each of the plurality of unit areas UA" may further include the processing for highlighting the selected lattice point SGP.

B. Second Embodiment

In the first embodiment, the projector 8 applies the distortion correction changed by the changing command HC to the input image data GD to generate the corrected image data CGD and projects the corrected image CG based on the corrected image data CGD onto the projection surface SC. On the other hand, in a second embodiment, the projector 8 applies the distortion correction, the processing for disposing the plurality of lattice points GP, and the processing for disposing the unit area identifier to the input image data GD to generate the corrected image data CGD and projects the corrected image CG based on the corrected image data CGD onto the projection surface SC.

The second embodiment is explained below. Elements having the same action and the same functions as those in the first embodiment in forms and modifications illustrated below are denoted by the reference numerals and signs used in the first embodiment. Detailed explanation of the respective elements is omitted as appropriate. To simplify explanation, the elements explained below are considered to be elements concerning the second embodiment unless specifically described otherwise.

B. 1. Configuration of the Second Embodiment

Figure 13:
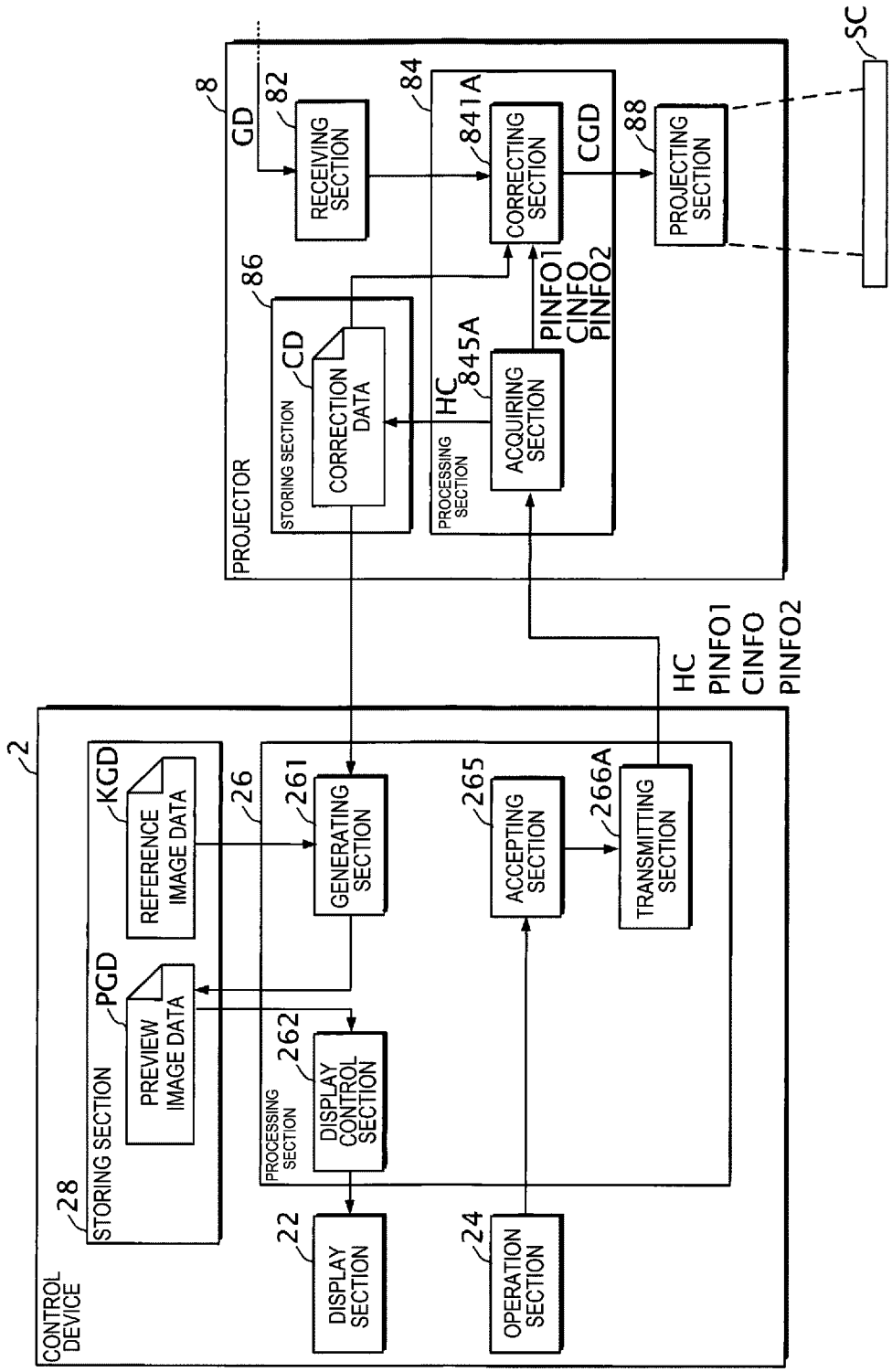
FIG. 13 is a diagram showing a configuration example of a display system in a second embodiment.

A configuration example of the display system 1 in the second embodiment is shown in FIG. 13. The processing section 26 reads and executes a computer program stored in the storing section 28 to thereby function as a transmitting section 266A instead of the transmitting section 266.

The transmitting section 266A transmits the changing command HC, first position information PINFO1, identification information CINFO, and second position information PINFO2 to the projector 8. The first position information PINFO1 indicates a position of each of the plurality of lattice points GP. The position indicated by the first position information PINFO1 is a position of the lattice point GP after the change by the changing operation. The identification information CINFO indicates a unit area identifier. The second position information PINFO2 indicates a position of the unit area identifier. The position of the unit area identifier is, for example, an average of the lattice points GP of the unit area UA or a position of the center of gravity of the unit area UA.

The processing section 84 reads and executes a computer program stored in the storing section 86 to thereby function as an acquiring section 845A instead of the acquiring section 845 and function as a correcting section 841A instead of the correcting section 841.

The acquiring section 845A acquires the changing command HC, the first position information PINFO1, the identification information CINFO, and the second position information PINFO2 from the transmitting section 266A. The acquiring section 845A updates the correction data CD based on the changing command HC.

The correcting section 841A applies the distortion correction, processing for disposing the plurality of lattice points GP in positions indicated by the first position information PINFO1, and processing for disposing an identifier indicated by the identification information CINFO in a position indicated by the second position information PINFO2 to the input image data GD to generate the corrected image data CGD. For example, the correcting section 841A applies the processing for disposing the plurality of lattice points GP in the positions indicated by the first position information PINFO1 and the processing for disposing the identifier indicated by the identification information CINFO in the position indicated by the second position information PINFO2 to the input image data GD. Image data indicating an image in which the plurality of lattice points GP and the identifier indicated by the identification information CINFO are disposed in the image indicated by the input image data GD is generated by these two kinds of processing. Subsequently, the correcting section 841A applies the distortion correction to the image data to generate the corrected image data CGD.

Figure 14:
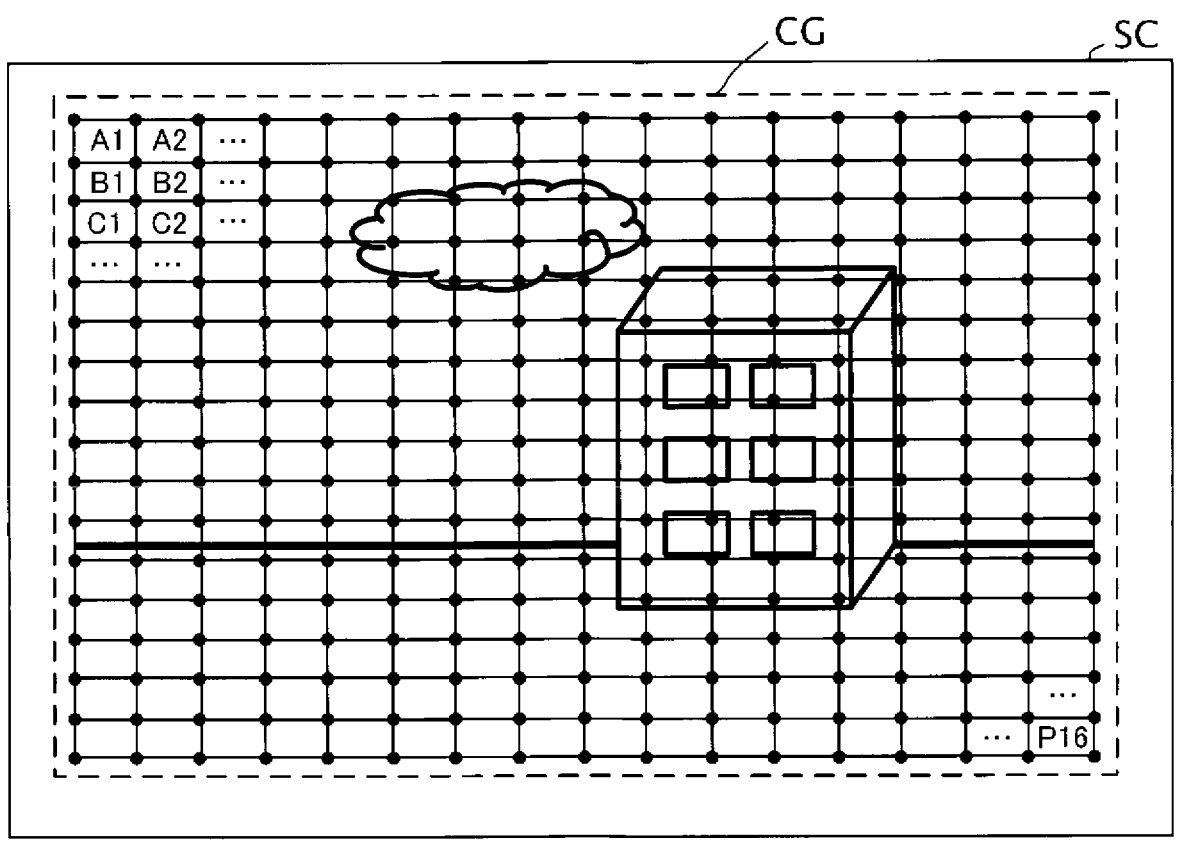
FIG. 14 is a diagram showing an example of a corrected image in the second embodiment.
Figure 14:
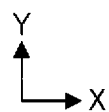

An example of the corrected image CG is shown in FIG. 14. The projecting section 88 projects the corrected image CG indicated by the corrected image data CGD onto the projection surface SC. Distortion of an image caused by the shape of the projection surface SC is offset by the distortion correction. Therefore, distortion is absent in the corrected image CG shown in FIG. 14. Further, the corrected image CG shown in FIG. 14 includes the plurality of lattice points GP and the unit area identifier. In FIG. 14, to prevent complication of the drawing, only a part of a plurality of unit area identifiers is representatively shown.

B. 2. Effects of the Second Embodiment

As explained above, in one form of the display system 1, the transmitting section 266A transmits the changing command HC, the first position information PINFO1 indicating the position of each of the plurality of lattice points GP, the identification information CINFO indicating the identifier for identifying one unit area UA in each of the plurality of unit areas UA, and the second position information PINFO2 indicating the position of the identifier indicated by the identification information CINFO to the projector 8. The correcting section 841 applies the distortion correction, the processing for disposing the plurality of lattice points GP in the positions indicated by the first position information PINFO1, and the processing for disposing the identifier indicated by the identification information CINFO in the position indicated by the second position information PINFO2 to generate the corrected image data CGD.

With the form explained above, by viewing the unit area identifier in the corrected image CG, the user is capable of easily identifying the respective unit areas UA. For example, it is assumed that distortion cannot be completely offset and remains in some part of the corrected image CG. By viewing the unit area identifier in the corrected image CG, the user can easily specify the lattice point GP of the unit area UA in the part where the distortion remains. Therefore, it is possible to facilitate distortion offset work carried out by the user.

C. Third Embodiment

In the second embodiment, the projector 8 applies the distortion correction, the processing for disposing the plurality of lattice points GP, and the processing for disposing the unit area identifier to the input image data GD to generate the corrected image data CGD and projects the corrected image CG based on the corrected image data CGD onto the projection surface SC. On the other hand, in a third embodiment, the projector 8 applies the distortion correction, the processing for disposing the plurality of lattice points GP, and the processing for highlighting the selected lattice point SGP to generate the corrected image data CGD and projects the corrected image CG based on the corrected image data CGD onto the projection surface SC.

The third embodiment is explained below. Elements having the same action and the same functions as those in the first or second embodiment in forms and modifications illustrated below are denoted by the reference numerals and signs used in the first or second embodiment. Detailed explanation of the respective elements is omitted as appropriate. To simplify explanation, the elements explained below are considered to be elements concerning the third embodiment unless specifically described otherwise.

C. 1. Configuration of the Third Embodiment

Figure 15:
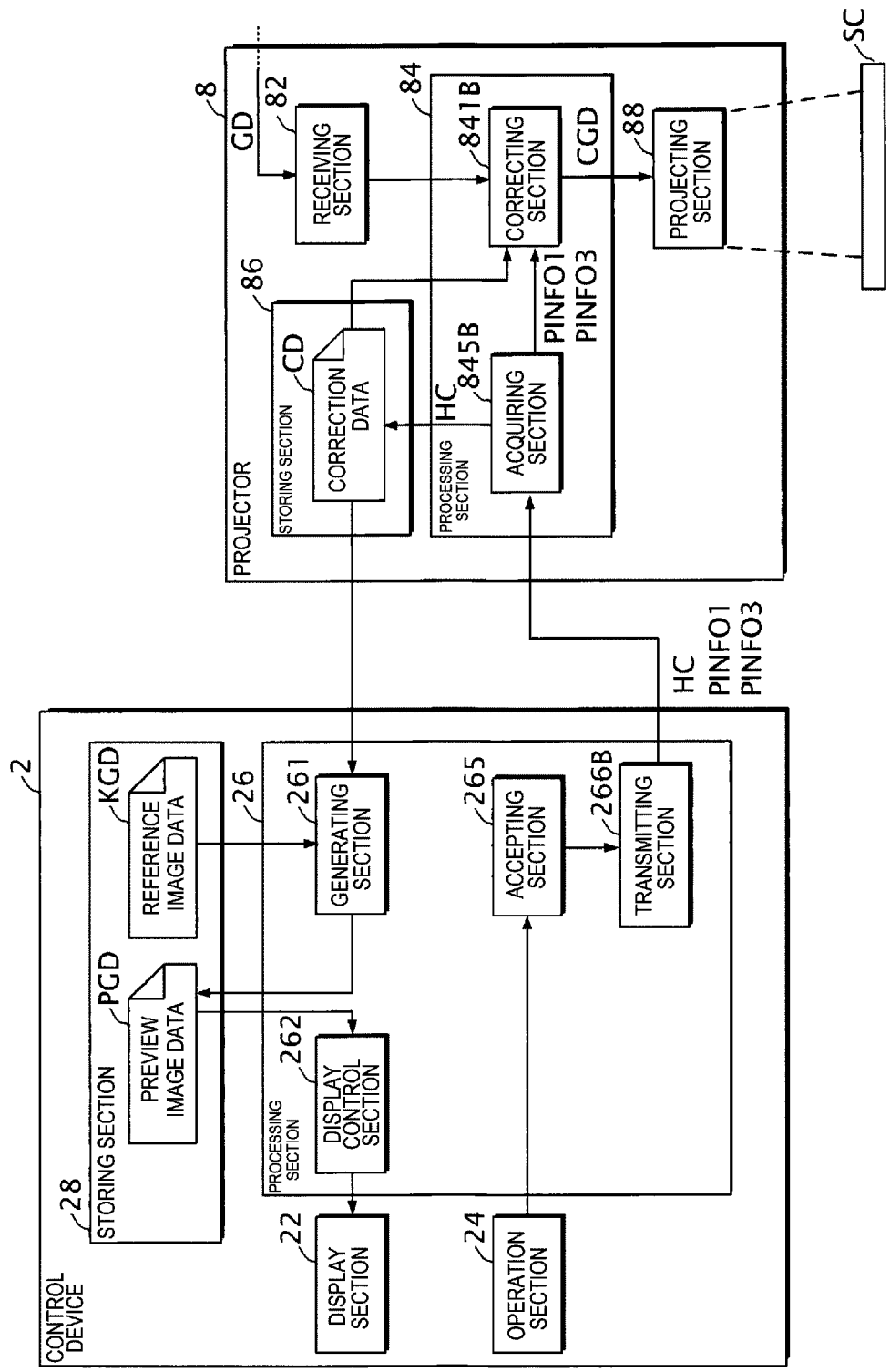
FIG. 15 is a diagram showing a configuration example of a display system in a third embodiment.

A configuration example of the display system 1 in the third embodiment is shown in FIG. 15. The processing section 26 reads and executes a computer program stored in the storing section 28 to thereby function as a transmitting section 266B instead of the transmitting section 266.

The transmitting section 266A transmits the changing command HC, the first position information PINFO1, and third position information PINFO3 to the projector 8. The third position information PINFO3 indicates a position of the selected lattice point SGP.

The processing section 84 reads and executes a computer program stored in the storing section 86 to thereby function as an acquiring section 845B instead of the acquiring section 845 and function as a correcting section 841B instead of the correcting section 841.

The acquiring section 845B acquires the changing command HC, the first position information PINFO1, and the third position information PINFO3 from the transmitting section 266B. The acquiring section 845B updates the correction data CD based on the changing command HC.

The correcting section 841B applies the distortion correction, the processing for disposing the plurality of lattice points GP in positions indicated by the first position information PINFO1, and processing for highlighting the lattice point GP in a position indicated by the third position information PINFO3 to the input image data GD to generate the corrected image data CGD.

Figure 16:
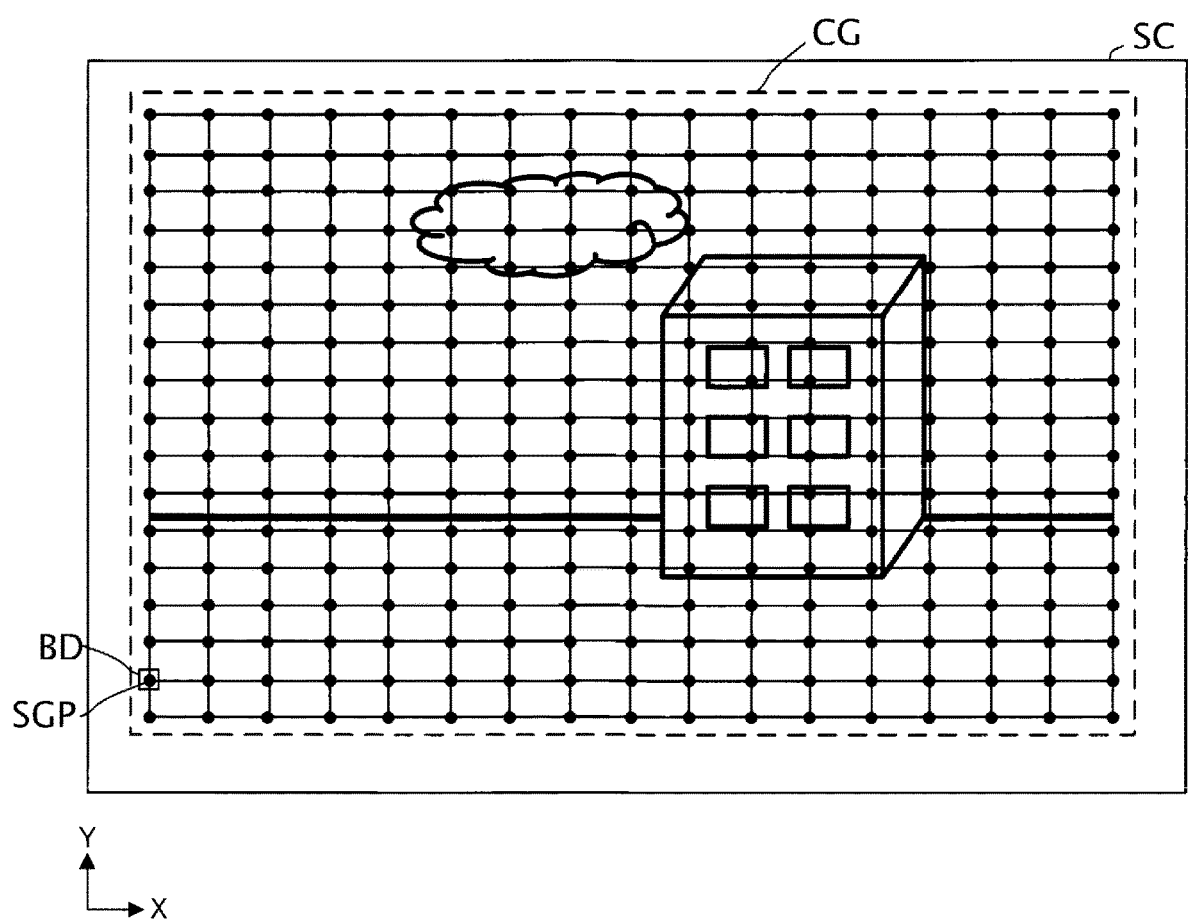
FIG. 16 is a diagram showing an example of a corrected image in the third embodiment.

An example of the corrected image CG is shown in FIG. 16. The projecting section 88 projects the corrected image CG indicated by the corrected image data CGD onto the projection surface SC. Distortion of an image caused by the shape of the projection surface SC is offset by the distortion correction. Therefore, distortion is absent in the corrected image CG shown in FIG. 16. Further, the corrected image CG shown in FIG. 16 includes the plurality of lattice points GP. Further, in the corrected image CG shown in FIG. 16, as the processing for highlighting the selected lattice point SGP, the frame BD surrounding the selected lattice point SGP is displayed.

C. 2. Effects of the Third Embodiment

As explained above, in one form of the display system 1, the plurality of lattice points GP are located at the vertexes in each of the plurality of unit areas UA. The transmitting section 266B transmits the changing command HC, the first position information PINFO1 indicating the position of each of the plurality of lattice points GP, and the third position information PINFO3 indicating the position of the selected lattice point SGP to the projector 8. The correcting section 841 applies the distortion correction, the processing for disposing the plurality of lattice points GP in the positions indicated by the first position information PINFO1, and the processing for highlighting the lattice point GP in the position indicated by the third position information PINFO3 to the input image data GD to generate the corrected image data CGD.

With the form explained above, by viewing the corrected image CG, the user is capable of easily grasping which of the plurality of lattice points GP the selected lattice point SGP is. For example, it is assumed that distortion cannot be completely offset and remains in some part of the corrected image CG. The user selects the lattice point GP in the distortion correction display screen 221 in order to offset the distortion. According to the selecting operation by the user, the corrected image CG includes the selected lattice point SGP to which the highlighting processing is applied. By viewing the corrected image CG, the user can easily determine whether the selected lattice point SGP to which the highlighting processing is applied and the lattice point GP in a position where the distortion remains are the same. Therefore, it is possible to facilitate distortion offset work carried out by the user.

D. Modifications

The forms explained above can be variously modified. Specific forms of the modifications are illustrated below. Two or more forms optionally selected from the following illustrations can be combined as appropriate within a range in which the forms do not contradict one another. Elements having the same action and the same functions as those in the first embodiment in the modifications illustrated below are denoted by the reference numerals and signs used in the above explanation. Detailed explanation of the respective elements is omitted as appropriate.

D. 1. First modification

In the forms explained above, the image providing device 4 provides the input image data GD to the projector 8. However, not only this, but, for example, the control device 2 may provide the input image data GD to the projector 8.

Figure 17:
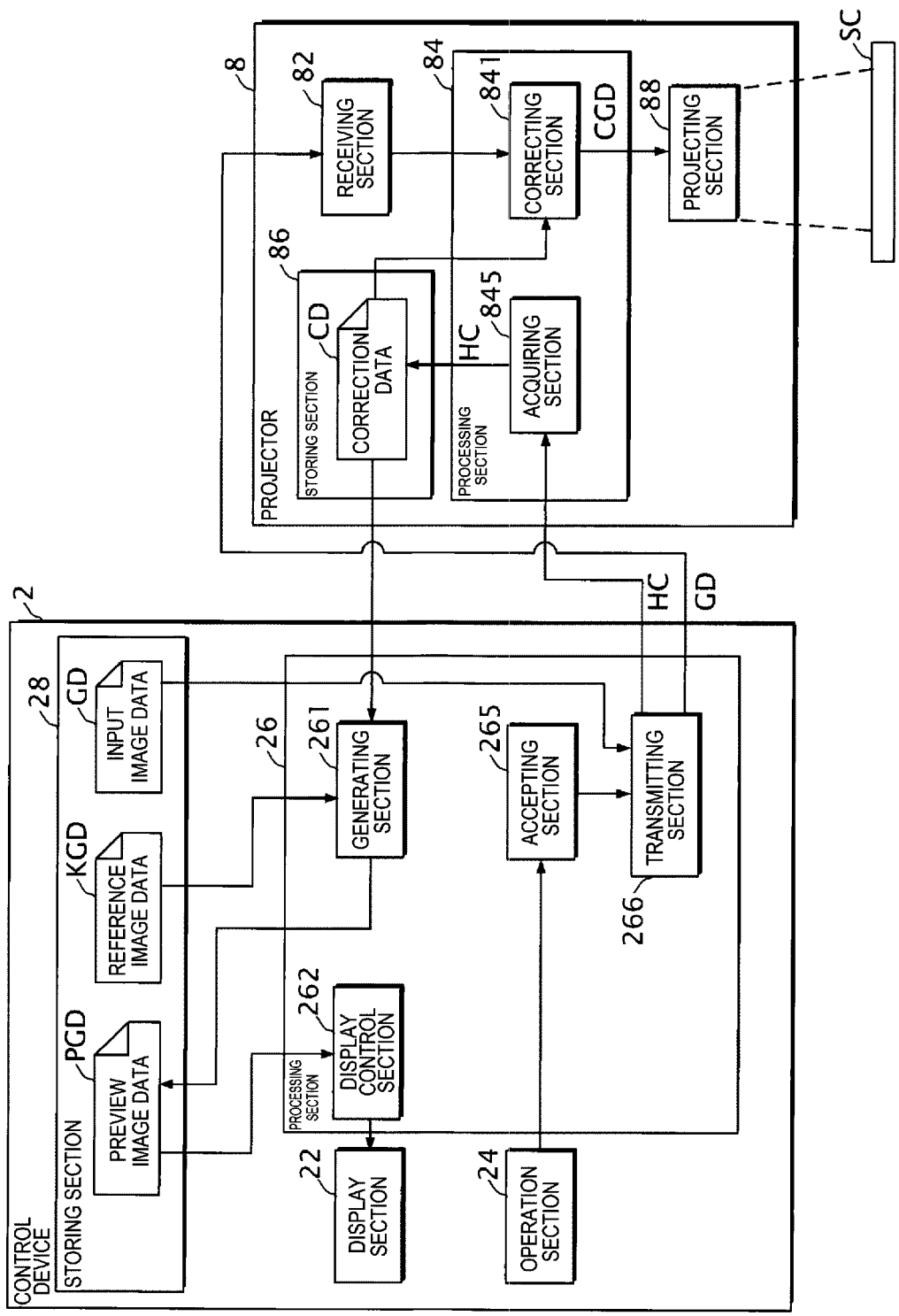
FIG. 17 is a diagram showing a configuration example of a display system in a first modification.

A configuration example of the display system 1 in the first modification is shown in FIG. 17. The storing section 28 stores the input image data GD. The transmitting section 266 transmits the changing command HC and the input image data GD to the projector 8. The input image data GD provided by the control device 2 indicates, for example, an image of a test pattern for adjustment. The image indicated by the input image data GD may include the plurality of lattice points GP and a unit area identifier for identifying one unit area in each of the plurality of unit areas UA.

As explained above, in one form of the display system 1, the plurality of lattice points GP are located at the vertexes in each of the plurality of unit areas UA. The image indicated by the input image data GD includes the plurality of lattice points GP and the identifier for identifying one unit area in each of the plurality of unit areas UA. The control device 2 includes the storing section 28 that stores the input image data GD. The transmitting section 266 transmits the changing command HC and the input image data GD to the projector 8. Since the image indicated by the input image data GD includes the plurality of lattice points GP and the unit area identifier, the projecting section 88 projects the corrected image CG including the plurality of lattice points GP and the unit area identifier.

With the form explained above, even when the image of the test pattern for adjustment is projected onto the projection surface SC, the user is capable of easily identifying the respective unit areas UA.

D. 2. Other Modifications

The shape of each of the unit areas UA before the distortion correction is a rectangle. However, not only this, but, for example, the shape of each of the unit areas A before the distortion correction may be a right-angled triangle.

In the forms explained above, the shape of the corrected image CG is a rectangle. However, not only this, but, for example, the shape of the corrected image CG may be a trapezoid or a circle.

In the first embodiment explained above, the third form of the preview image PG may include unit area identifiers of all the unit areas UA or may include unit area identifiers of a part of the unit areas UA. When the third form of the preview image PG includes the unit area identifiers of a part of the unit areas UA, for example, the preview image PG may include unit area identifiers of the unit areas UA alternate in the x-axis direction or the y-axis direction among all the unit areas UA or may include unit area identifiers of the unit areas UA alternate in the x-axis direction and the y-axis direction. The preview image PG not to be enlarged may include the unit area identifiers of a part of the unit areas UA and the preview image PG to be enlarged may include all the unit area identifiers.

In the second embodiment as well, the corrected image CG may include the unit area identifiers of all the unit areas UA or may include the unit area identifiers of a part of the unit areas UA.

In the first or second embodiment explained above, the unit area identifier is desirably disposed in the unit area UA. However, a part or the entire unit area identifier may be disposed on the outer side of the unit area UA.

In the projecting section 88 in the forms explained above, the liquid crystal light valve is used as the optical modulation device. However, the optical modulation device is not limited to the liquid crystal light valve and can be changed as appropriate. For example, the optical modulation device may have a configuration including three liquid crystal panels of a reflection type. The optical modulation device may have a configuration of a type including one liquid crystal panel, a type including three digital mirror devices (DMDs), a type including one digital mirror device, or the like. When only one liquid crystal panel or DMD is used as the optical modulation device, members equivalent to a color separation optical system and a color combination optical system are unnecessary. Besides the liquid crystal panel and the DMD, a component capable of modulating light emitting by a light source can be adopted as the optical modulation device.

In the forms explained above, all or a part of the elements realized by the processing section 26 executing the computer programs may be realized with hardware by an electronic circuit such as an FPGA (Field Programmable Gate Array) or an ASIC (Application Specific IC) or may be realized by cooperation of software and hardware. All or a part of the elements are specified as a control method of the control device 2 according to the forms explained above. Concerning the processing section 84, similarly, all or apart of the elements realized by the processing section 84 executing the computer programs may be realized as hardware by an electronic circuit such as an FPGA or an ASIC or may be realized by cooperation of software and hardware.

What is claimed is:

1. A display system comprising:
a projector; and
a control device coupled to the projector, wherein the projector includes:
a correcting section configured to apply distortion correction to input image data to generate corrected image data; and
a projecting section configured to project a corrected image based on the corrected image data, and
the control device includes:
a generating section configured to apply, based on correction data indicating content of the distortion correction acquired from the projector, processing including the distortion correction to reference image data indicating a reference image including a plurality of lattice points to generate preview image data indicating a preview image;
a display section configured to display the preview image based on the preview image data;
an accepting section configured to accept enlarging operation for the preview image, selecting operation for selecting a lattice point set as a correction target among a plurality of lattice points included in the preview image to be enlarged, and changing operation for changing a position to the lattice point to be selected; and
a transmitting section configured to generate, according to the changing operation, a changing command for changing the distortion correction in the correcting section and transmit the changing command to the projector.

2. The display system according to claim 1, wherein the generating section applies processing including the distortion correction and processing for highlighting the lattice point to be selected to the reference image data to generate the preview image data indicating the preview image.

3. The display system according to claim 1, wherein
the plurality of lattice points are located at vertexes in each of a plurality of unit areas, and
the generating section applies processing including the distortion correction and processing for disposing an identifier for identifying one unit area in each of the plurality of unit areas to generate the preview image data indicating the preview image.

4. The display system according to claim 3, wherein
the transmitting section transmits the changing command, first position information indicating a position of each of the plurality of lattice points, identification information indicating the identifier for identifying one unit area in each of the plurality of unit areas, and second position information indicating a position of the identifier indicated by the identification information to the projector, and
the correcting section applies the distortion correction, processing for disposing a plurality of lattice points in positions indicated by the first position information, and processing for disposing the identifier indicated by the identification information in a position indicated by the second position information to the input image data to generate the corrected image data.

5. The display system according to claim 1, wherein
the plurality of lattice points are located at vertexes in each of a plurality of unit areas,
the transmitting section transmits the changing command, first position information indicating a position of each of the plurality of lattice points and third position information indicating a position of the lattice point to be selected to the projector, and
the correcting section applies the distortion correction, processing for disposing a plurality of lattice points in positions indicated by the first position information, and processing for highlighting a lattice point in a position indicated by the third position information to the input image data to generate the corrected image data.

6. The display system according to claim 1, wherein
the plurality of lattice points are located at vertexes in each of a plurality of unit areas,
an image indicated by the input image data includes the plurality of lattice points and an identifier for identifying one unit area in each of the plurality of unit areas,
the control device includes a storing section configured to store the input image data, and
the transmitting section transmits the changing command and the input image data to the projector.

7. A control method for a display system including a projector and a control device coupled to the projector, the control method comprising:

applying, by the projector, distortion correction to input image data to generate corrected image data;
projecting, by the projector, a corrected image based on the corrected image data;
applying, by the control device, processing including the distortion correction to reference image data indicating a reference image including a plurality of lattice points based on correction data indicating content of the distortion correction acquired from the projector to generate preview image data indicating a preview image,
displaying, by the control device, the preview image based on the preview image data,
accepting, by the control device, enlarging operation for the preview image, selecting operation for selecting a lattice point set as a correction target among a plurality of lattice points included in the preview image to be enlarged, and changing operation for changing a position to the lattice point to be selected; and
generating, by the control device, a changing command for changing the distortion correction according to the changing operation and transmitting the changing command to the projector.

8. A non-transitory computer-readable storage medium storing a program of a control device coupled to a projector that applies distortion correction to input image data to generate corrected image data and projects a corrected image based on the corrected image data, the control device including a display section, the program causing the control device to function as:
a generating section configured to apply, based on correction data indicating content of the distortion correction acquired from the projector, processing including the distortion correction to reference image data indicating a reference image including a plurality of lattice points to generate preview image data indicating a preview image;
a display control section configured to cause the display section to display the preview image based on the preview image data;
an accepting section configured to accept enlarging operation for the preview image, selecting operation for selecting a lattice point set as a correction target among a plurality of lattice points included in the preview image to be enlarged, and changing operation for changing a position to the lattice point to be selected; and
a transmitting section configured to generate, according to the changing operation, a changing command for changing the distortion correction and transmit the changing command to the projector.

* * * * *